R. G. Elder.
Baking-Pan.
N° 73703. Patented Jan. 28, 1868.
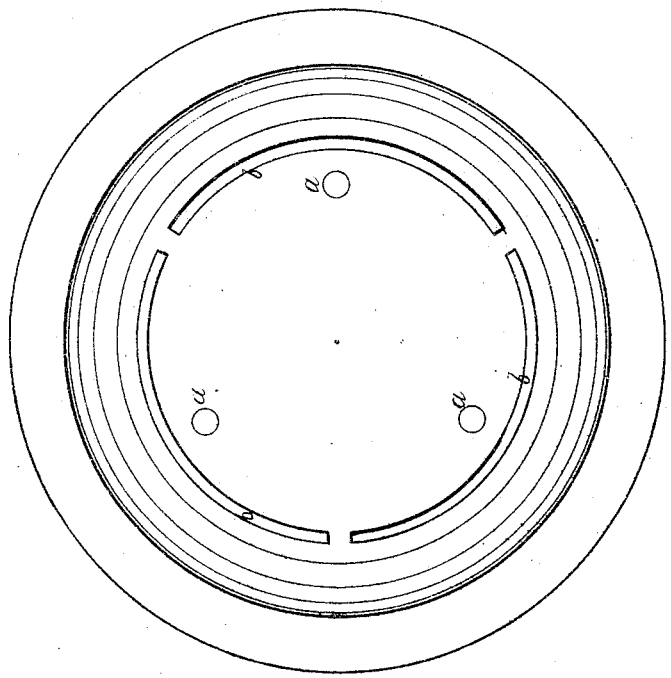
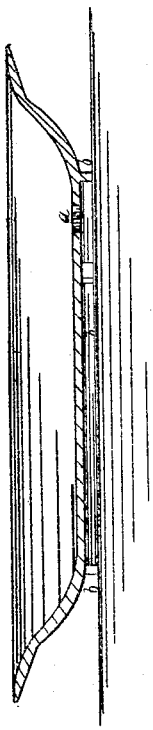
Witnesses
W. Hauff
Geo. F. Southern
Inventor
R. G. Elder

UNITED STATES PATENT OFFICE.

R. G. ELDER, OF NEW YORK, N. Y.

IMPROVEMENT IN BAKING-PANS.

Specification forming part of Letters Patent No. 73,703, dated January 28, 1868.

*To all whom it may concern:*

Be it known that I, R. G. ELDER, of No. 66 Bank street, New York, in the county and State of New York, have invented a new and Improved Baking-Dish; and I do hereby declare that the following is a full, clear, and exact description thereof, which will enable those skilled in the art to make and use the same, reference being had to the accompanying drawings, forming part of this specification, in which drawings—

Figure 1 represents a vertical central section of this invention. Fig. 2 is an inverted plan of the same.

Similar letters indicate corresponding parts.

This invention relates to a baking-dish which is provided with a broken or sectional rim at and with holes in its bottom in such a manner that a free circulation of air and heat takes place under the bottom crust of the article to be baked, allowing said crust to evaporate freely and to bake just as nice as the crust on the top.

In baking-dishes of the ordinary construction the bottom is either solid or in some exceptional cases it is provided with holes and with a solid unbroken rim. In either case the bottom crust of the article to be baked cannot evaporate, and it is very difficult to bake in such dishes custard-pie or other articles containing a great percentage of moisture, the top crust of such articles being liable to burn or char before the bottom crust is sufficiently baked. This difficulty is obviated by my baking-dish, which is provided with holes $a$ in its bottom and with a sectional or broken rim, $b$, at its under surface, said rim serving for the legs which support the dish. By this arrangement a free circulation of air and heat takes place under the bottom crust of the article to be baked, allowing said crust to evaporate freely and to bake with the same facility as the top crust.

My baking-dish is made of cast-iron, or it may be made of earthenware, china, or any other suitable material; and it is obvious that the number of holes in its bottom and the number of breaks in the rim may be increased to any desired extent; or, instead of the sectional rim, three or more legs might be applied to the dish, thereby supporting said dish at a certain elevation above the surface on which it stands and allowing the air to circulate freely under its bottom.

What I claim as new, and desire to secure by Letters Patent, is—

A baking-dish provided with a sectional or broken rim, $b$, under and holes $a$ in its bottom, substantially as and for the purpose described.

R. G. ELDER.

Witnesses:
W. HAUFF,
GEO. F. SOUTHERN.